(12) United States Patent
Gebhardt et al.

(10) Patent No.: US 12,612,251 B2
(45) Date of Patent: Apr. 28, 2026

(54) STORAGE AND RETRIEVAL SYSTEM, AND STATION FOR A STORAGE AND RETRIEVAL SYSTEM

(71) Applicant: Gebhardt Foerdertechnik GmbH, Sinsheim (DE)

(72) Inventors: Marco Gebhardt, Sinsheim (DE); Joerg Eder, Kaiserslautern (DE)

(73) Assignee: Gebhardt Foerdertechnik GmbH, Sinsheim (DE)

( * ) Notice: Subject to any disclaimer, the term of this patent is extended or adjusted under 35 U.S.C. 154(b) by 14 days.

(21) Appl. No.: 18/553,510

(22) PCT Filed: Dec. 21, 2022

(86) PCT No.: PCT/DE2022/200311
§ 371 (c)(1),
(2) Date: Sep. 29, 2023

(87) PCT Pub. No.: WO2023/151735
PCT Pub. Date: Aug. 17, 2023

(65) Prior Publication Data
US 2024/0190653 A1      Jun. 13, 2024

(30) Foreign Application Priority Data

Feb. 10, 2022   (DE) ..................... 10 2022 201 404.9

(51) Int. Cl.
*B65G 1/04*            (2006.01)
(52) U.S. Cl.
CPC ......... *B65G 1/0478* (2013.01); *B65G 1/0428* (2013.01); *B65G 1/0464* (2013.01)
(58) Field of Classification Search
CPC .. B65G 1/0464; B65G 1/0485; B65G 1/0478; B65G 1/0428; B65G 1/02
See application file for complete search history.

(56) References Cited

U.S. PATENT DOCUMENTS

| | | | | |
|---|---|---|---|---|
| 11,981,505 B2* | 5/2024 | Austrheim | .......... | B65G 1/1378 |
| 2019/0009984 A1* | 1/2019 | Hognaland | ......... | B65G 1/0485 |

(Continued)

FOREIGN PATENT DOCUMENTS

| | | |
|---|---|---|
| CN | 110980069 A | 4/2020 |
| DE | 2316630 | 10/1973 |

(Continued)

OTHER PUBLICATIONS

International Search Report and Written Opinion for International Application No. PCT/DE2022/200311, date of mailing Apr. 14, 2023, 11 pages.

(Continued)

*Primary Examiner* — Kaitlin S Joerger
(74) *Attorney, Agent, or Firm* — Seed Intellectual Property Law Group LLP

(57)      ABSTRACT

A storage and retrieval system for containers that can be moved along a shaft of a station by way of a gripper. A guide device for guided vertical movement of the gripper is designed such that (a) the guide device has at least one guide element which protrudes upward from the gripper, for guiding cooperation with the shaft or a storage column and/or with an upper closure element of a transport vehicle and/or gripper, and projects upward at least in the uppermost position of the gripper beyond an upper end of the transport vehicle or the closure element, or terminates flush with the upper end or the closure element, and/or (b) the guide device has at least one guide element which can be moved downwards from a lower end of the shaft or from at least one support of the shaft, for guiding cooperation with the gripper and/or the container.

20 Claims, 13 Drawing Sheets

(56) References Cited

U.S. PATENT DOCUMENTS

| | | | | |
|---|---|---|---|---|
| 2022/0306383 | A1* | 9/2022 | Fjeldheim ............ | B65G 1/0464 |
| 2023/0128175 | A1* | 4/2023 | Phaneuf ............... | B65G 1/0478 |
| | | | | 700/218 |
| 2023/0145633 | A1* | 5/2023 | Austrheim .............. | B66C 19/00 |
| | | | | 414/807 |
| 2023/0365333 | A1* | 11/2023 | Heggebø .............. | B65G 1/0464 |
| 2024/0217740 | A1* | 7/2024 | Heggebø .............. | B65G 1/0464 |
| 2024/0425277 | A1* | 12/2024 | Stuhaug .................. | B66C 1/663 |

FOREIGN PATENT DOCUMENTS

| | | | |
|---|---|---|---|
| EP | 1 037 828 | B1 | 9/2000 |
| WO | 2014/075937 | A1 | 5/2014 |
| WO | 2017/121515 | A1 | 7/2017 |
| WO | 2017/211634 | A1 | 12/2017 |
| WO | 2020/200631 | A1 | 10/2020 |
| WO | 2021/197867 | A1 | 10/2021 |

OTHER PUBLICATIONS

English Translation of International Preliminary Report on Patentability and Written Opinion for International Application No. PCT/DE2022/200311, date of issuance Aug. 6, 2024, 7 pages.

* cited by examiner

STORAGE AND RETRIEVAL SYSTEM, AND STATION FOR A STORAGE AND RETRIEVAL SYSTEM

BACKGROUND

Technical Field

The present disclosure relates to a storage and retrieval system for containers.

Furthermore, the present disclosure relates to a station for such a storage and retrieval system.

Description of the Related Art

Storage and retrieval systems are known in practice and exist in various embodiments. WO 2020/200631 A1 discloses, for example, such a storage and retrieval system 1 for containers 106 . The storage and retrieval system 1 is designed as a block storage. Access to the containers 106 is created by means of a station in the form of a workspace, for example a picking workspace. The workspace can be arranged at different positions in a storage and retrieval system 1, for example on each side of the block storage. Transport vehicles 200 in the block storage can deliver containers 106 directly to a conveyor, which can convey a container 106 to an operator. A plate-shaped gripper 17, with which a container 106 can be gripped, serves to move a container 106 in a shaft of the lattice structure. A guide shuttle 19 serving as a guide device is arranged above the gripper 17, and has substantially the dimensions of a rectangular container, wherein rollers are arranged in the corner regions thereof to stabilize and guide the gripper 17 together with the guide shuttle 19 during the movement in a shaft and during a movement of the gripper 17 outside the shaft.

Furthermore, a storage and retrieval system for containers 106 is known from WO 2021/197867 A1, wherein a gripper 3 for containers 106 has two guide bolts 15 on its upper side, which guide bolts can be inserted into passages 16 of a linear guide 19 mounted on a transport vehicle 10 in order to guide the gripper 3 when it moves upward out of a shaft. However, this guide device does not permit guidance of the gripper 3 if it moves downward out of a shaft.

Many known automated block storages are designed to operate only with one container height. These systems are very popular in recent years. The previously-dominant technology was the automatic storage and retrieval system, SRS, based on shuttles or storage and retrieval devices, SRD. These SRSs are very flexible with regard to storing containers, boxes, and shelf boards of various sizes. The system can store both containers with different base areas and container with different heights. Since the containers are stacked in automatic block storages, it has become established for the sake of simplicity to use only one container height in a system.

EP 1 037 828 B1 discloses an automated block storage with a grid or a lattice structure, and equally-large containers, which can be subdivided differently as shown in a plan view in FIG. 4 in the document.

A significant problem arises, for example, in the guidance of the gripper for containers in the shaft. It usually moves within a shaft to the vertical supports of the shaft structure or rack structure. For containers with different heights, when there is a transfer to a workspace, to a conveyor, or to a driverless transport system (FTS), it is necessary in the case of a container of lower height and at the same time conventional shaft structure for the gripper to drop below the guide provided by the supports, in order to set down and/or transfer the container of lower height. This threading and unthreading of the gripper out of the guide leads to problems for setting items down, also for lifting containers—since, for example, the gripping openings in the container can often no longer be held precisely as soon as the gripper leaves the guide, and is thus unguided. This can lead to problems in the form of an inaccurate positioning of the container and/or the gripper, a swinging movement of the gripper, possibly damage to the gripper when moving back into the shaft, and/or to there only being the possibly of slow movement of the gripper outside the guide. It is not to be forgotten that external influences can also act on an unguided freely suspended gripper and container—for example air drafts, air flows of an air conditioning system, vibrations due to a passing forklift/FTS and vibrating machines in the surroundings, an asymmetric/tilting container loading which can lead to a tilt of the container, and the like. In this respect, suitable guidance of the gripper outside the shaft as well is very important.

The guide devices known from the prior art in the form of a guide shuttle or an arrangement consisting of a linear guide mounted on the transport vehicle, with passages for bolts arranged on the gripper, are very complex in terms of construction. In particular, the implementation of a guide shuttle above the gripper requires a very high construction of the transport vehicle, with a high housing for receiving the guide shuttle and grippers in the raised state of the gripper. This high construction of the transport vehicle reduces the driving dynamics of the transport vehicle, since the center of gravity of such a transport vehicle is higher than in transport vehicles without a guide shuttle. As a result, this reduces the performance of the storage and retrieval system.

BRIEF SUMMARY AND INITIAL DESCRIPTION

The present disclosure is therefore based on the object of specifying a storage and retrieval system and a station for a storage and retrieval system, according to which a high-performance and safe operation of the storage and retrieval system is made possible by structurally simple means.

According to the disclosure, the above object is achieved by a storage and retrieval system, and by a station, as described herein.

In at least one embodiment, a storage and retrieval system as described herein includes a lattice structure having a plurality of lattice cells, each lattice cell defining a storage column of a container storage structure arranged below the lattice structure, the storage columns being configured to each receive a vertical stack of containers, and the lattice structure defining longitudinal transport paths in a longitudinal direction and horizontal transport paths in a transverse direction, and at least one transport vehicle for containers designed to travel along the longitudinal transport paths and/or horizontal transport paths. A container can be moved by way of a gripper assigned to the transport vehicle or the lattice structure along a shaft of a station assigned to the lattice structure, to create an access to at least one container, and/or along a storage column, substantially in the direction of a lower end of the shaft or of the storage column, coming from a transport vehicle, or in the opposite direction toward the transport vehicle, and wherein a guide device for a guided vertical movement of the gripper outside the shaft or the storage column is assigned to the gripper, the shaft, and/or the storage column.

As further described herein, (a) the guide device has at least one guide element which protrudes upward from the gripper, for guiding cooperation with an inner region or structural element of the shaft or of the storage column and/or with an upper closure element of the transport vehicle and/or gripper, and the at least one guide element projects upward at least in the uppermost position of the gripper beyond an upper end of the transport vehicle or the closure element, or terminates flush with the upper end or the closure element, and/or (b) the guide device has at least one guide element, which can be moved downward by a lower end of the shaft or by at least one vertical support of the shaft, for guiding cooperation with the gripper and/or the container.

In principle, the system and station described herein are useful for handling containers of different heights, and also containers having the same height, in storage and retrieval systems designed as automatic block storage. This relates, for example, to the storage and to the transfer of containers of different heights to an employee, to a conveyor system, or to a driverless transport system (FTS), and/or to the receipt by an employee, by a conveyor system, or by a driverless transport system.

In an inventive manner, it was first recognized that advantages of the present disclosure are achieved in a surprisingly simple manner by a clever design of the gripper and/or the shaft. Furthermore according to the present disclosure, as a concrete realization of (a) described above, the guide device is equipped with at least one guide element which protrudes upward from the gripper, for example vertically, wherein the at least one guide element is designed for guiding cooperation with an inner region or structural element of the shaft or the storage column, and/or with an upper closure element of the transport vehicle and/or gripper. The cooperation with an inner region or structural element of the shaft or of the storage column occurs, for example, when the gripper leaves the shaft at the bottom thereof, and would thus be unguided without the provision of a guide element outside the shaft. In this situation, the at least one guide element can take over a secure guidance of the gripper on the shaft via the guide element. The cooperation with an upper closure element of the transport vehicle and/or gripper occurs, for example, when the gripper leaves the shaft or a storage column at the top thereof, and would also be unguided in this situation without the provision of a guide element outside the shaft or storage column. This situation can occur, for example, in a position of the gripper in which the gripper is moving towards its uppermost position in a transport vehicle, and has left the shaft or a storage column at the top thereof, but has not yet reached its uppermost position in the transport vehicle. In this intermediate state, the gripper can be subject to an unfavorable pivoting movement or swinging movement if the transport vehicle is moving straight on the lattice structure. Because of the at least one guide element, such a pivoting movement or swinging movement can be largely prevented.

Furthermore according to (a) described above, the at least one guide element is designed such that it projects upward at least in the uppermost position of the gripper beyond an upper end of the transport vehicle or beyond the closure element, or terminates flush with the upper end or the closure element. Whether the at least one guide element projects upward beyond the upper end or the closure element, or terminates flush with the upper end or the closure element, can be considered individually and depending on the application. In the case of a correspondingly long configuration of the at least one guide element, with a projection upward, a guidance of the gripper after leaving the shaft or a storage column is possible to a greater extent than in the case of a shorter configuration of the at least one guide element with a flush termination. The flush termination specifically offers a particularly secure positioning of the gripper in its uppermost position, since in this case an cooperation of the at least one guide element with an upper end of the transport vehicle or the closure element is possible. In this case, a guidance of the at least one guide element in the above-described intermediate state is only possible to a limited extent.

The projection of the at least one guide element beyond the upper end or the closure element in principle achieves a displacement upward of the center of gravity in the transport vehicle, and thus a worsening of the driving characteristics or the driving dynamics of the transport vehicle in comparison with conventional transport vehicles without a guide device. However, the displacement of the center of gravity and the worsening of the driving behavior or the driving dynamics with the guide device according to the present disclosure is far less than for the guide device known from the prior art which has a guide shuttle, since this guide shuttle has an overall significantly increased housing structure of the transport vehicle for receiving the guide shuttle in the uppermost state of the gripper, with a significant displacement of the center of gravity of the transport vehicle upward, and thus a significant worsening of the driving behavior or the driving dynamics of the transport vehicle. In the present disclosure, no such increased housing structure is created, and the driving behavior or the driving dynamics therefore remain substantially the same as for a transport vehicle without a guide device.

Furthermore according to the present disclosure, alternatively or additionally according to (b) described above, the guide device has at least one guide element which can be moved downward from a lower end of the shaft or from at least one support of the shaft, for cooperating guidance with the gripper and/or the container when the gripper moves downward out of the shaft, for example to deposit a low container, for example, onto a conveyor, or to remove it therefrom. This at least one guide element allows for a reliable coupling of the gripper into and out of the shaft. In this case, the at least one guide element can be realized as, and function as, an extension of the shaft or of a support of the shaft downwards.

Consequently, with the storage and retrieval system according to the present disclosure and the station according to the present disclosure, a storage and retrieval system and a station are provided, according to which a high-performance and reliable operation is made possible by structurally simple means.

The described station can be implemented as a work station of the storage and retrieval system for operating personnel, wherein a plurality of workspaces or work stations can be realized on or in a lattice structure of the storage and retrieval system. In the simplest case, a station can be formed by a shaft open at the top and bottom. Such a shaft can be realized in the manner of a storage column which is open at the bottom, so that containers can be discharged downwards by way of a gripper.

Furthermore, in this document, the term "container" includes any vessel or any receiving device suitable for storing and/or transporting suitable conveyed goods.

With regard to a structurally particularly simple embodiment, the at least one guide element can be designed to be elongate and/or flat, for example in the form of an elongated profile element, rod, polygonal tube, multi-edged bar, mandrel, flat strip, flat sheet, or flat steel. A profile or profile element can be an aluminum extrusion profile and/or have an L, O, or I shape. The specific embodiment can be selected to match the inner region or a structural element of the shaft or the storage column, or the closure element, in order to enable the most reliable possible cooperation between the guide element and the inner region or structural element of the shaft or the storage column or the closure element.

To ensure a secure and simple cooperation between the guide element and the shaft, the structural element of the shaft, or the storage column or closure element, the at least one guide element can have at least one roller and/or at least one slide bar, for example made of plastic. Such rollers or slide bars can be arranged to be adjustable on the guide element in order to enable individual adaptation to the shaft, the storage column or the closure element, and thus a smooth and reliable operation.

With regard to a particularly flexible and secure adaptation to individual properties of the shaft, structural element of the shaft, or the storage column or closure element, the at least one guide element can have a main guide arranged at the height and/or in the region of the gripper, and/or an auxiliary guide arranged above the gripper. Such a main guide can be of particularly robust design, since the main guide typically works in the shaft or in the storage column during any movement of the gripper. In contrast to this, an auxiliary guide can be designed in a structurally simpler and lighter manner, since such an auxiliary guide is usually not used as often as the main guide. As a result, a weight savings is possible which improves the driving dynamics of the transport vehicle when the gripper is completely raised. The auxiliary guide can be integrated with somewhat more, or an equal amount, of play as the main guide into the system consisting of gripper and shaft or storage column and/or closure element.

In one embodiment with somewhat more play, the coupling into and out of the shaft or the storage column is simplified. The main guide can be arranged essentially around the gripper in order to ensure a particularly reliable guidance of the gripper in the shaft or in the storage column. If the gripper is located outside the shaft or the storage column, the main guide does not act. Such a combination of main guide and auxiliary guide can be realized in such a way that the auxiliary guide leaves the shaft or a support of the shaft or of the storage column only at the top, and the main guide leaves the shaft or a support of the shaft only at the bottom. This has the advantage that, in each movement state of the gripper, guidance is ensured by the shaft or a support of the shaft or the storage column, either by the main guide or the auxiliary guide. In this case, the guidance can be partially ensured only by way of a slide bar on the guide element. In this case, the slide bar is always—i.e., in each position of the gripper—in engagement with the shaft or the support of the shaft or the storage column. The auxiliary guide and the main guide can each have one or more rollers and/or slide bars or can be made up of one or more of these components.

In a particularly flexible manner, the at least one guide element can be designed to be able to be coupled and uncoupled by way of a coupling device on the gripper or shaft or support of the shaft. In applications in which no additional guidance of the gripper outside the shaft is desired, the at least one guide element can be uncoupled from the gripper in order to enable a simpler structure of the gripper and thus of the transport vehicle. In this case, the driving dynamics of the transport vehicle is not impaired even when the gripper is completely raised. Furthermore, depending on the application and the resulting requirements, a shorter or longer guide element can be coupled to the gripper. In this case, longer guide elements are usually required when containers with highly variable heights are used. The coupling device can have, for example, a screw mechanism with an internal thread and an external thread on the guide element and/or gripper, in order to enable the guide element to be screwed to the gripper.

To ensure a particularly safe operation of the storage and retrieval system, the at least one guide element can have an adjustment device for adjusting the angular position of the guide element relative to a vertical, and/or for adjusting the horizontal position of the guide element. Such an adjustment device can have a pivot mechanism with a clamping device for the guide element with an adjustment screw. To adjust the horizontal position, the adjustment device can have a slide device with a clamping device by way of which the guide element can be moved and fixed in a horizontal plane relative to the gripper in order to enable the best possible adaptation to an inner region of the shaft, to a structural element of the shaft, or to the storage column or to the cover element.

Furthermore, with regard to a particularly safe operation of the storage and retrieval system, the closure element can have a cover for the transport vehicle and/or the gripper arranged at the upper end of the transport vehicle, or can form an upper side of a housing for the transport vehicle and/or the gripper, wherein the cover and/or the upper side preferably form the upper end of the transport vehicle and/or the gripper. As a result, a secure closure, and a secure enclosure, for the transport vehicle are realized, in order to prevent an undesired interaction with the components of the storage and retrieval system, or a risk of injury to operating personnel.

With regard to safe operation of the gripper, the closure element, the cover, the housing or the upper side can have at least one passage and/or at least one recess for the at least one guide element, which recess is continuous in the vertical direction. The at least one guide element with the gripper can securely reach an upper position, or its uppermost position relative to the transport vehicle, through such a passage or through and along such a recess. In this case, the at least one guide element can be guided as it slides through the passage or the recess during its movement. In this case, the at least one guide element can essentially pierce the closure element, the cover, the housing or the upper side, and/or the given recess or the given passage, in order to project beyond the closure element, the cover, the housing or the upper side. The number of passages or recesses can correspond in this case to the number of guide elements. Such a recess can also be realized on one or more sides of the closure element, the cover, the housing or the upper side along a part of the length of the side, or—for the sake of simplicity—along the entire length of the side.

So that the at least one guide element can reliably penetrate, plunge into, or pass alongside a passage or into a recess as described, all components of the transport vehicle or of a boom of the transport vehicle having the gripper can be arranged such that the at least one guide element can move freely in a, or through a, passage or in a, or through, a recess. The transport vehicle remains low due to this penetration, plunging, or passage alongside, as a result of which the center of gravity remains low, so that the driving behavior of the transport vehicle remains or is advantageous.

With regard to a particularly smooth and secure movement of the at least one guide element through such a passage or through such a recess, the passage and/or the recess can have an insertion aid for the at least one guide element—for example, a funnel or a bevel. For a position of guide element and passage or recess that is not exactly aligned, this enables a secure movement of the at least one guide element through such a passage or through such a recess. The insertion aid can be realized in an inner wall or wall of the passage or of the recess, wherein the inner wall or wall can be conically tapered, opening downwards.

With regard to a particularly safe operation of the storage and retrieval system, a guide or lining for the at least one guide element can be assigned to the gripper, the closure element, the cover, the housing or the upper side. This prevents the at least one guide element from projecting with essentially no control out of the gripper, the closure element, the cover, the housing or the upper side, in an upper or uppermost position of the gripper. As a result, the guide element can be protected from damage or contamination from the outside, the guide element does not pose a risk of injury to the operating personnel, and the at least one guide element can be supported by the lattice structure during travel, so that no disruptive vibrations are generated by the at least one guide element. Such a guide or lining can be adapted to the dimensions of the at least one guide element—such as, for example, a sheath—with regard to its shape, width, length, height and/or diameter.

In view of a particularly secure guidance of the gripper, multiple guide elements can be arranged in corner regions of the gripper. In this case, an undesired horizontal or swinging movement of a gripper outside the shaft or the storage column is largely avoided.

In a particularly flexible and comfortable manner, the at least one guide element can be designed to be telescopically extendable and retractable. When not in use, the at least one guide element can be retracted in order to prevent disruption to the operation, and can be extended in a flexible manner when needed. In this case, the at least one guide element is also arranged particularly protected in the retracted state, which increases the safety of the operation of the storage and retrieval system.

In order to ensure a safe extension and retraction, a drive for moving the at least one guide element can be arranged at the lower end of the shaft or can be arranged on at least one support of the shaft, wherein, for example, the drive can have an electric motor or servomotor. In addition to such a motorized drive, a manual drive can also be realized.

For adaptation to different container heights, the movement of the at least one guide element is possible to different lengths downwards—preferably continuously. In this case, a movement of the at least one guide element can take place only to such an extent as is necessary, depending on the height of the container, to set the container securely down or to pick it up from below. In the case of higher containers, it does not have to be extended as far as with lower containers.

In the following, advantages and aspects of embodiments of the present disclosure are explained:

Due to the projection of the at least one guide element beyond an upper closure element or an upper end of the transport vehicle, the basic shape of the transport vehicle does not have to be higher, which is advantageous for the driving dynamics and tilting resistance of the transport vehicle. A main guide can usually have rollers between the gripper and a support of the shaft or of the storage column, or the shaft or the storage column. The at least one guide element, or an auxiliary guide—which are not required as frequently—can form an extension and can additionally have rollers and/or slide bars made of plastic, for example.

The coupling of the gripper into and out of the shaft or the storage column can be realized in a simplified and secure manner via inlet bevels and/or outlet bevels arranged on the shaft or the storage column and/or on the gripper. Alternatively or in addition to this, the movement speed of the gripper can be reduced when the gripper is coupled in and out, in order to enable the gripper to be securely coupled in and out.

As an alternative or in addition to these features, a guide pin can be arranged on the shaft or the storage column or on a support of the shaft or the storage column or on the at least one guide element and can engage with a guide rail arranged on the gripper and/or on the shaft or the storage column or on a support of the shaft or the storage column or on a transport vehicle.

If a transport vehicle transports a container in the raised state on the lattice structure, the container is stabilized with the aid of a guide element of the gripper, carried on the closure element, so that an unfavorable swinging movement, or vibrating movements, of the gripper with the container hanging on it can be largely prevented during transport. Via the guide elements, contact can be produced between the gripper and the closure element, for example a transport vehicle boom. This advantageously makes it possible to raise a low container only enough that it extends just above the lattice structure, in order to ensure smooth zero transport. Lifting further upward in the transport vehicle or on the boom is not necessary, since the container is already stabilized in the lower position by way of the guide element in such a way that a vibration-free transport at the gripper is possible. As a result, the travel path for a container during operation can be reduced, which saves time in the "grabbing" process and the lifting and transporting of many containers, and thus improves the dynamics of the storage and retrieval system.

The at least one guide element can comprise the main guide and the auxiliary guide described above, wherein the main guide can be realized by a known guide of the gripper, for its movement in the shaft or in the storage column, so that in this case the at least one guide element can consist of a known guide and additionally of an upwardly-projecting part in the form of the auxiliary guide. In this case, the at least one guide element can be constructed in a modular manner such that the auxiliary guide can be removed when using only high containers in which the auxiliary guide is not used. If lower containers, or containers of different heights, will be used, the auxiliary guide can be mounted again in a simple manner.

The main guide and/or auxiliary guide can be implemented on two, preferably diagonally opposite, three, or four supports.

The auxiliary guide can be oriented as vertically as possible in order to easily catch containers underneath the shaft, on, for example, a conveyor system or a driverless transport system, with little play, and in order not to create problems above the shaft or the storage column during insertion into the shaft or into the storage column.

Furthermore, the at least one guide element enables a secure guidance on a fire protection wall integrated into the lattice structure.

In addition, in all embodiments, the at least one guide element can stabilize the gripper against tilting in the shaft or in the storage column in a manner improved compared to the prior art. This effect occurs for any container heights. The gripper is thus guided securely horizontally in the shaft or in the storage column, and can engage more reliably with containers than is possible in systems according to the prior art.

Furthermore, in embodiments of the storage and retrieval system according to the present disclosure, a container does not have to have any change in construction, for example a recess, to interact with the at least one guide element by way of the gripper. For improved guidance of the gripper or the container, the at least one guide element does not have to dip into a recess in a container—for example, as is necessary in systems according to the prior art. In embodiments of the storage and retrieval system according to the present disclosure, this results in an unrestricted ability to choose containers, without special constructive modifications to a container.

The at least one guide element can be designed to extend far enough upward that it or the auxiliary guide reaches the upper closure element or a boom at the top, and can be supported there, before the main guide leaves the shaft or the storage column or the support of a shaft or the storage column. The gripper is thus guided continuously on the transport vehicle when a container is taken up. This is particularly advantageous when the gripper is moved without a container, and thus would be completely unguided— without at least one such guide element. For a movement with a high container, this is also not a problem in the prior art, since the container, due to its length, usually assumes the task of guiding the gripper.

Not only in this embodiment, the at least one guide element have a slide bar for smooth engagement with the closure element or the boom, since the contact surface or sliding surface on the cover element or the boom is usually very short. As an alternative or in addition to this, an insertion aid or receiving aid for the at least one guide element, for example a funnel or a bevel, can be included to achieve a smooth start of the interaction between the guide element and the closure element or the boom on the closure element or the boom.

BRIEF DESCRIPTION OF THE SEVERAL VIEWS OF THE DRAWINGS

There are various possibilities for designing and developing the teaching of the present disclosure in an advantageous manner. In this regard, attention is hereby directed, on the one hand, to the subordinate claims, and on the other hand to the following explanation of preferred embodiments of the storage and retrieval system according to the disclosure and of the station according to the disclosure, with reference to the drawings. In conjunction with the illustration of the preferred embodiments of the disclosure on the basis of the drawings, generally preferred embodiments and developments of the teaching are also illustrated. In the drawings:

DETAILED DESCRIPTION

Figure 1:
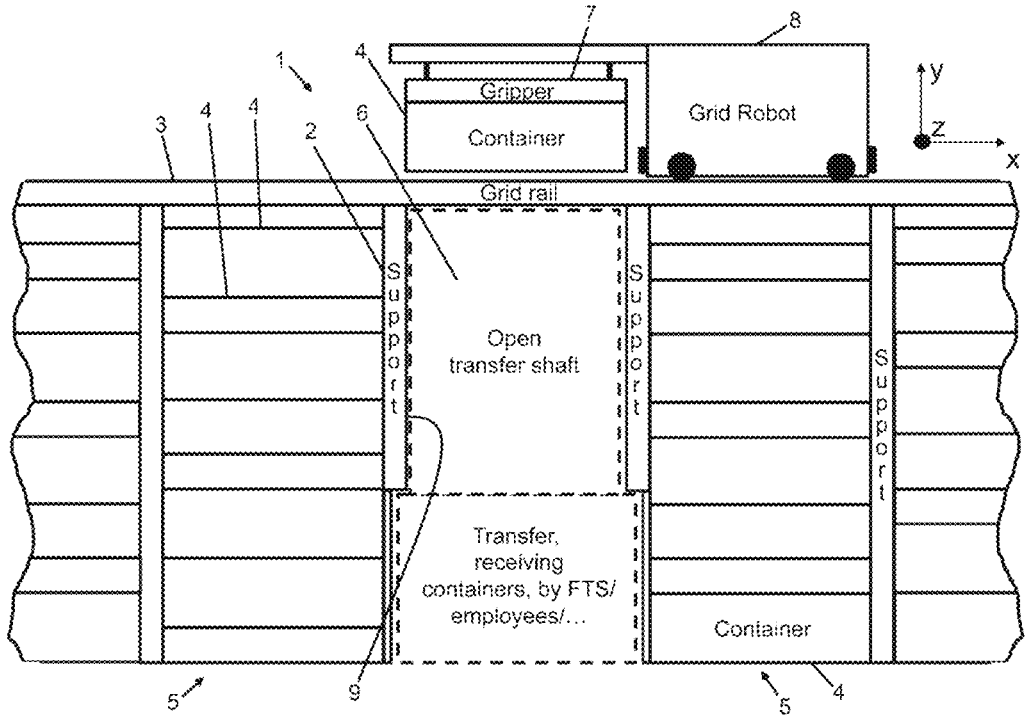
FIG. 1 to FIG. 4 show schematic side views of operating situations in known storage and retrieval systems, wherein FIG. 3 additionally shows a plan view of a container arranged in a shaft.

FIG. 1 is a schematic side view of a basic arrangement of a known storage and retrieval system designed as a block storage. A station 1 is shown in the region of supports 2 of a lattice structure 3. In the storage and retrieval system, a number of containers 4 are usually stacked one above the other, as a result of which a storage column 5 is formed. The containers 4 shown here are of different heights. Material to be conveyed is transported in the containers 4. The lattice structure 3 has a plurality of rectangular or square lattice cells with storage columns 5. The station 1 has a shaft 6 serving as an open transfer shaft, wherein containers 4 can be moved in the shaft 6 or in the storage column 5 by way of a gripper 7. A shaft 6 is usually delimited in the corners by four supports 2; lateral surfaces can also be covered over their entire surface. The containers 4 can, for example, be placed on a conveyor (not shown here) or on a driverless transport system, or be received by an employee. In the opposite direction, the containers 4 can again be transported in storage columns 5. For this purpose, usually one or more transport vehicles 8 which can be driven on the lattice structure 3 or on grid rails and are designed, for example, as grid robots.

A conveyor arranged in the lower region of the shaft 6 serves for horizontal movement of containers 4, wherein the containers 4 can be conveyed out of the shaft 6 through an access opening. To guide the containers 4, and the gripper 7 which is movable in the shaft 6 and which is fastened on the transport vehicle 8 in this case, a container- or gripper guide 9 is arranged on the side of the shaft 6, or is formed by the supports 2. Such a station 1 allows for access to containers 4, and for picking.

Figure 2:
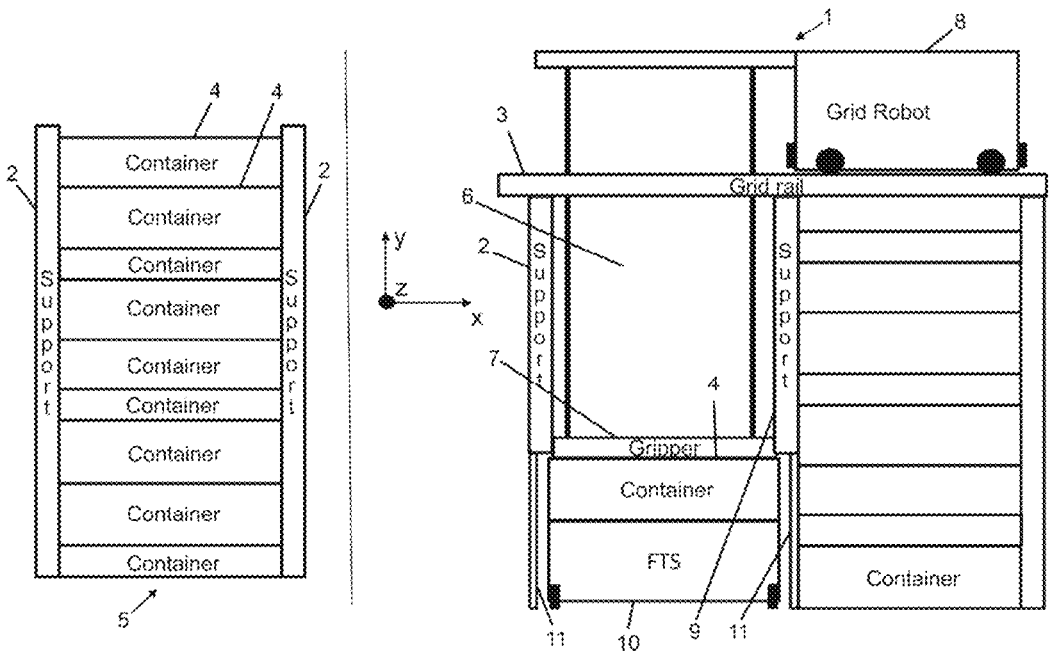

FIG. 2 shows a schematic side view at left of a stack of containers 4, each of which has a different height. At right in FIG. 2, the storage and retrieval system from FIG. 1 is shown in part with the station 1, wherein the gripper 7 is moved by the transport vehicle 8 in the Y direction downwards in order to set a container 4 down on a driverless transport system (FTS) 10, or to take it from an FTS 10. The gripper 7 is still guided within the supports 2. The supports 2 each have a recess 11 in their lower region in order to be able to remove containers 4 from the shaft 6 in the Z or X direction, or introduce them into the shaft 6.

Figure 3:
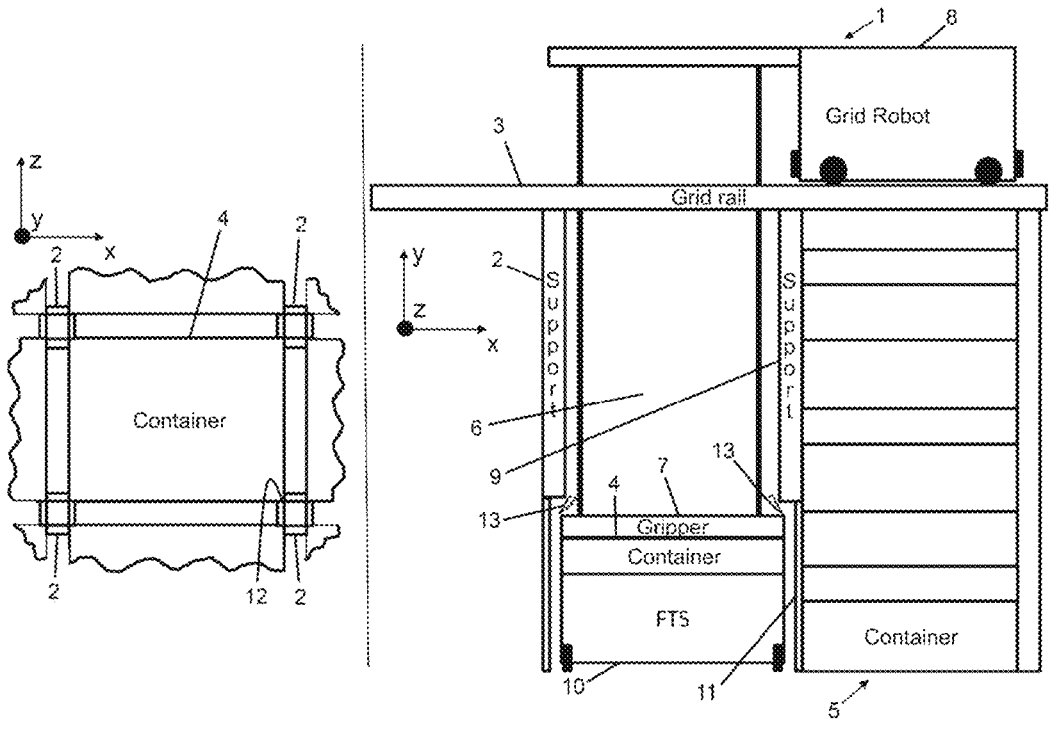

FIG. 3 shows in the left-hand region of FIG. 3 a container 4 guided in a shaft 6 by supports 2, in a plan view. The supports 2 have groove-shaped elongated corner recesses 12 for guiding the container 4 in the shaft 6. No recesses 11 are made in the upper region of the shaft 6. In the right area in FIG. 3, the arrangement of the storage and retrieval system with the station 1 from FIG. 2 is shown in a schematic side view, wherein in this case a container 4 is used which is lower than in FIG. 2, so that the gripper 7 must exit, or depart, the container- or gripper guide 9 to take or transfer the container 4. In this situation, and in particular shortly before the transfer or shortly after the transfer of the container 4, the gripper 7 is unguided, and is thereby susceptible to external influences such as, for example, air drafts. During re-entry or during coupling into the container- or gripper guide 9, it is possible for the gripper 7 to get jammed or to buck—even possibly damaging the container- or gripper guide 9 in the lower region thereof, as is illustrated by the arrows 13. Unproblematic operation is not ensured in this case.

Figure 4:
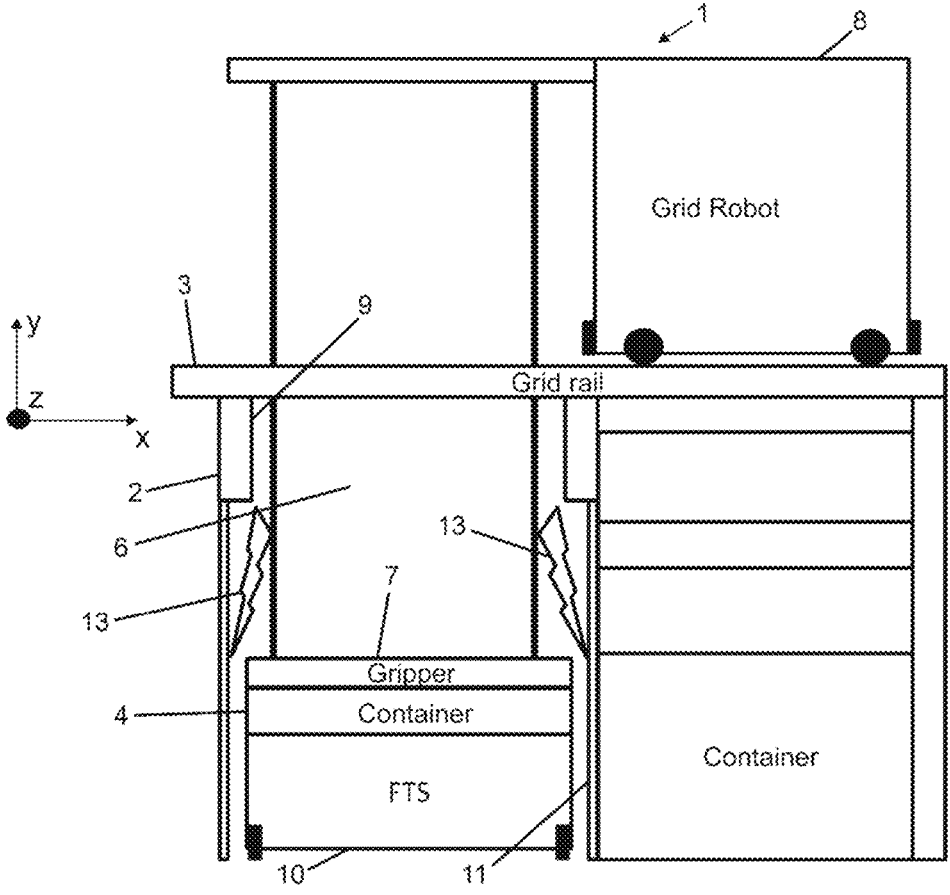

FIG. 4 shows in a schematic side view again the problem of the storage and retrieval system of FIG. 3 in an emphasized manner, wherein, in this case, a storage and retrieval system is used which is suitable for containers 4 with even greater height differences between the containers 4. In this case, the situation is still more problematic than in FIG. 3, since the gripper 7 still has to be moved downward out of its container- or gripper guide 9 in order to set down the low container 4, or pick it up.

Figure 5:
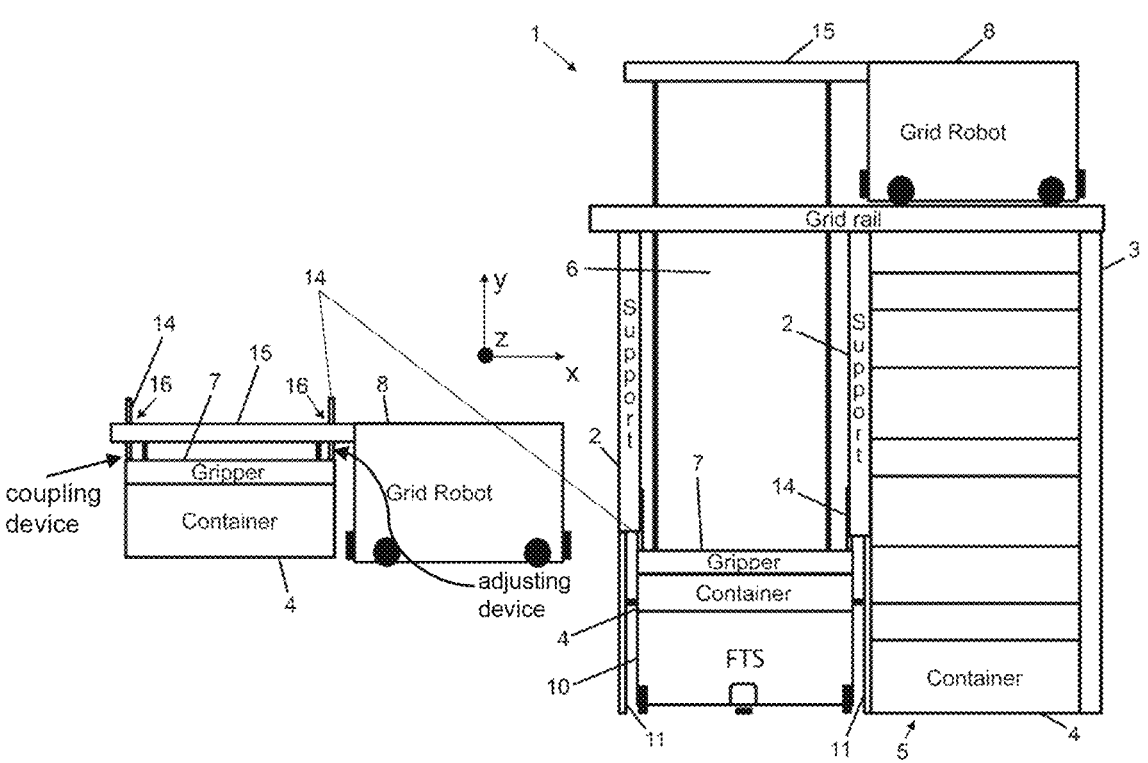
FIGS. 5 and 6 show schematic side views of two different embodiments of a storage and retrieval system according to the present disclosure, according to variants (a) and (b) of the guide device.
Figure 6:
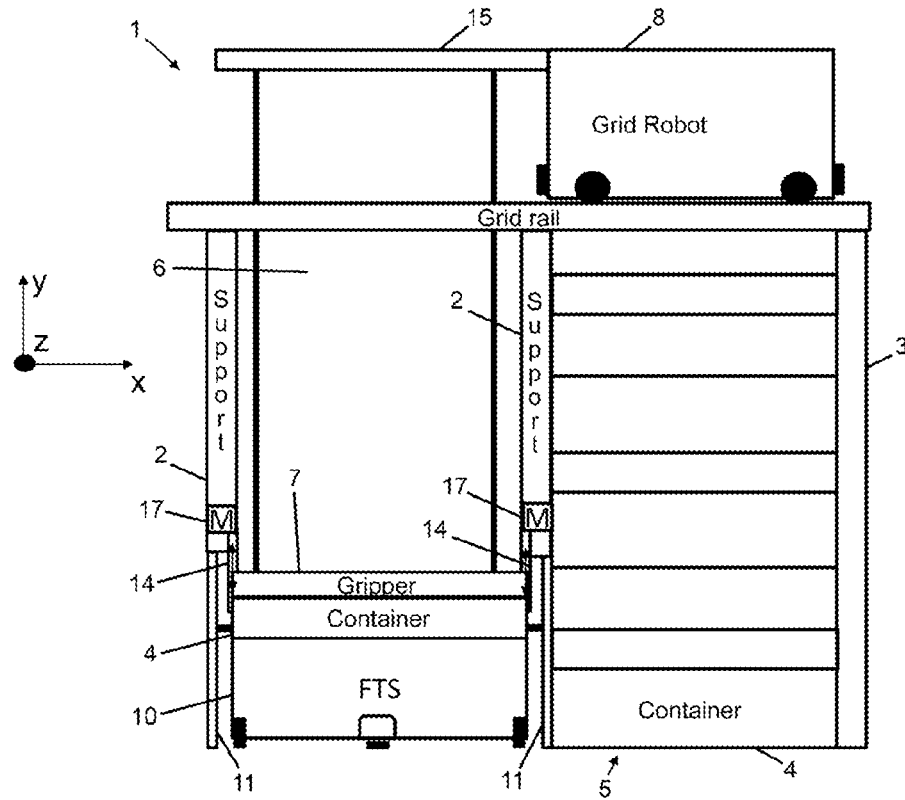

FIGS. 5 and 6 each show schematic side views of embodiments of variants (a) and (b) of the guide device according to the disclosure. In this case, FIG. 5 shows the station 1 with a gripper 7 extended downwards out of the shaft 6 in the right half The gripper 7 here is currently in the process of depositing a low container 4 onto an FTS, or picking it up. Guide elements 14 projecting upward from the gripper 7 interact with supports 2 of the shaft 6, so that the gripper 7, together with the container 4, is in a stably guided situation, even if the gripper 7 with the container 4 is located outside the shaft 6 and below the supports 2 of the shaft 6.

In the left half of FIG. 5, the gripper 7 with the container 4 is moved upward to a height in which it can be moved with the transport vehicle 8 on the lattice structure 3 without grinding along the lattice structure. In this state, the guide elements 14 penetrate into passages 16 in a closure element 15 of the transport vehicle 8. The gripper 7 is mounted or suspended on the closure element 15. By way of the cooperation of the guide elements 14 and the passages 16, stabilization and secure guidance of the gripper 7 with the container 4 is also possible when it is located above and thus outside the shaft 6.

It is important here that the guide elements 14, which project upwards in the upper position of the gripper 7 beyond the closure element 15, when compared to a conventional transport vehicle 8 with a gripper 7 without guide elements 14, only result in a very slight displacement of the center of gravity of the transport vehicle 8 upward. As a result, the driving dynamics of the transport vehicle 8 with the container 4 attached are not significantly worse. The advantage of the stabilized gripper 7 with the container 4 is much greater than the minimal worsening of the driving dynamics.

FIG. 6 shows the variant (b) of the guide device with guide elements 14 that can be moved downwards from a lower end of the shaft 6 or the support 2 of the shaft 6. These guide elements 14 cooperate with the gripper 7 and/or the container 4. In the state shown here, they interact both with the gripper 7 and with the container 4. The guide elements 14 can be moved downwards by way of motors 17 when a container 4 is used which is so low that the gripper 7 must move downwards from the shaft 6 to set the container 4 down on an FTS 10, or to pick up the container 4 from an FTS 10. This situation is shown in FIG. 6, in which the gripper 7 with the container 4 is guided securely by way of the guide elements 14. The guide elements 14 can be moved out different distances and continuously in the downward direction in order to allow for an adaptation to different container heights. In both described embodiments, it is possible to securely couple the gripper 7 into and out of the shaft 6.

Figure 7:
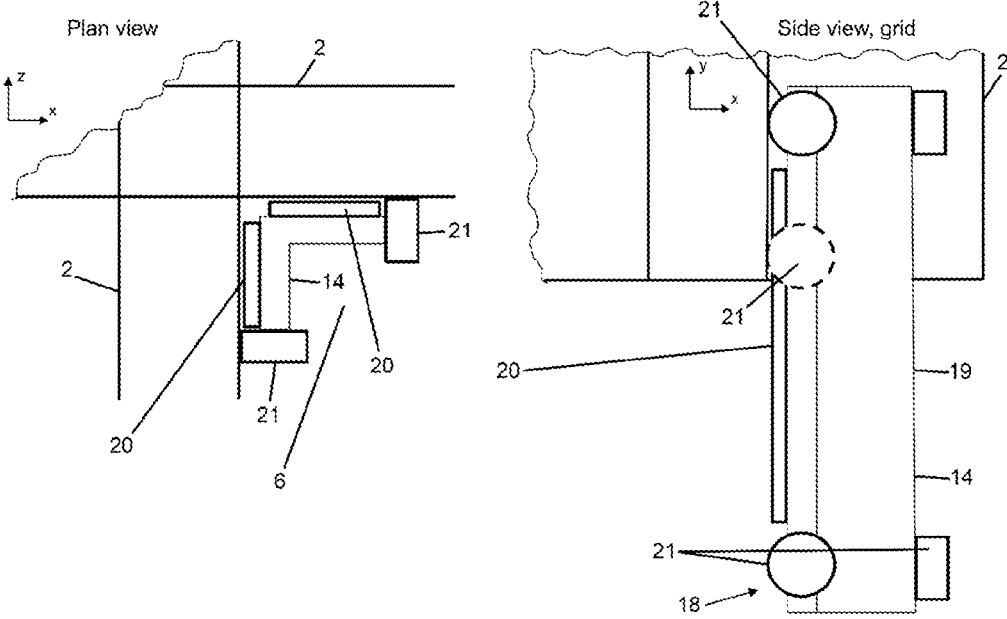
FIG. 7 shows a schematic plan view and a schematic side view, enlarged and partial, of a further embodiment of a storage and retrieval system according to the present disclosure, according to variant (a) of the guide device.

FIG. 7 is a schematic plan view and a schematic side view of a further embodiment of a storage and retrieval system according to the disclosure, according to variant (a) of the guide device. A guide element 14 is shown which is realized in the form of an L-shaped profile and which has a main guide 18 and an auxiliary guide 19. For the sake of clarity, the gripper 7 is not shown here. However, it is located at the height of the main guide 18, which guides the gripper 7 in any position in which the gripper 7 is within the shaft 6. In the state shown here, the main guide 18 is out of function, since the gripper 7, which is not shown here, is located together with the main guide 18 below a height of the lower end of the support 2, and thus outside the shaft 6. However, the auxiliary guide 19 guides the gripper 7, since it is in contact via its upper end with the support 2. The guide element 14 optionally has one or more slide bars 20 and/or one or more rollers 21. AS such, it is possible that the entire guide element 14 with its main guide 18 and its auxiliary guide 19 has only one, or has several, slide bars 20—or only one, or several, rollers 21. The design and number of slide bars 20 and rollers 21 can be selected individually.

Figure 8:
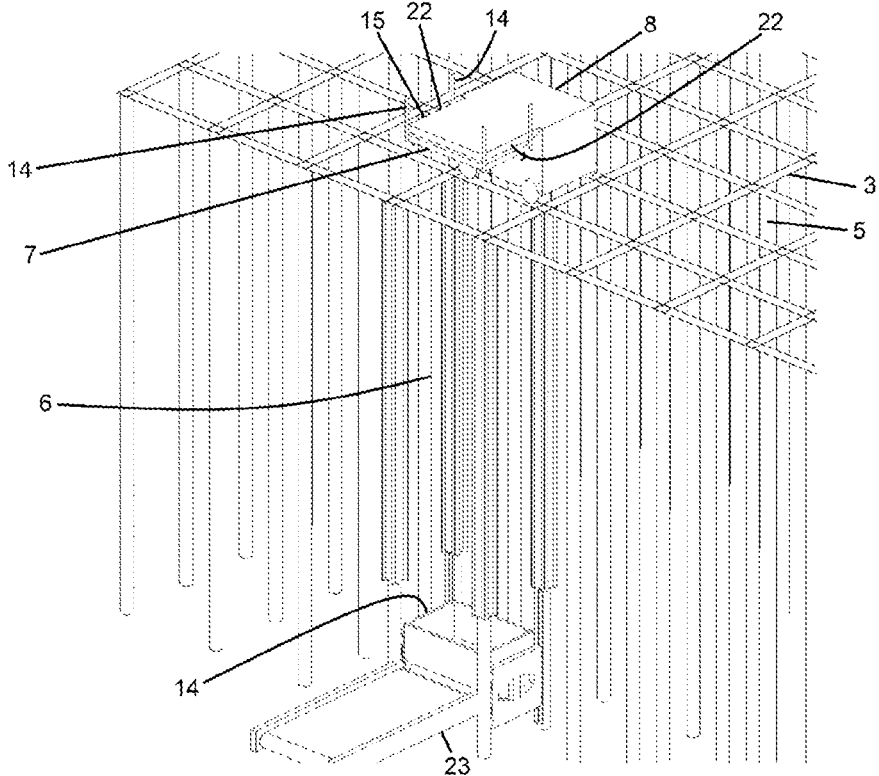
FIG. 8 to FIG. 12 show partial perspective side views of a further embodiment according to variant (a), in different operating situations.

FIGS. 8 to 12 show in perspective side views, partially, a further embodiment according to variant (a) in different operating situations. In this case, the gripper 7 in FIG. 8 is in an uppermost position on the upper closure element 15 of the transport vehicle 8. The guide elements 14 are formed at four corners of the gripper 7 and are located in the region of a longitudinal recess 22 of the closure element 15. As a result, the gripper 7 is securely guided above the lattice structure 3 after leaving the shaft 6 or a storage column 5. A conveyor system 23 for containers 4 is realized below the shaft 6. Instead of a conveyor system 23, a driverless transport system or another conveyor or transfer device can also be implemented here.

Figure 9:
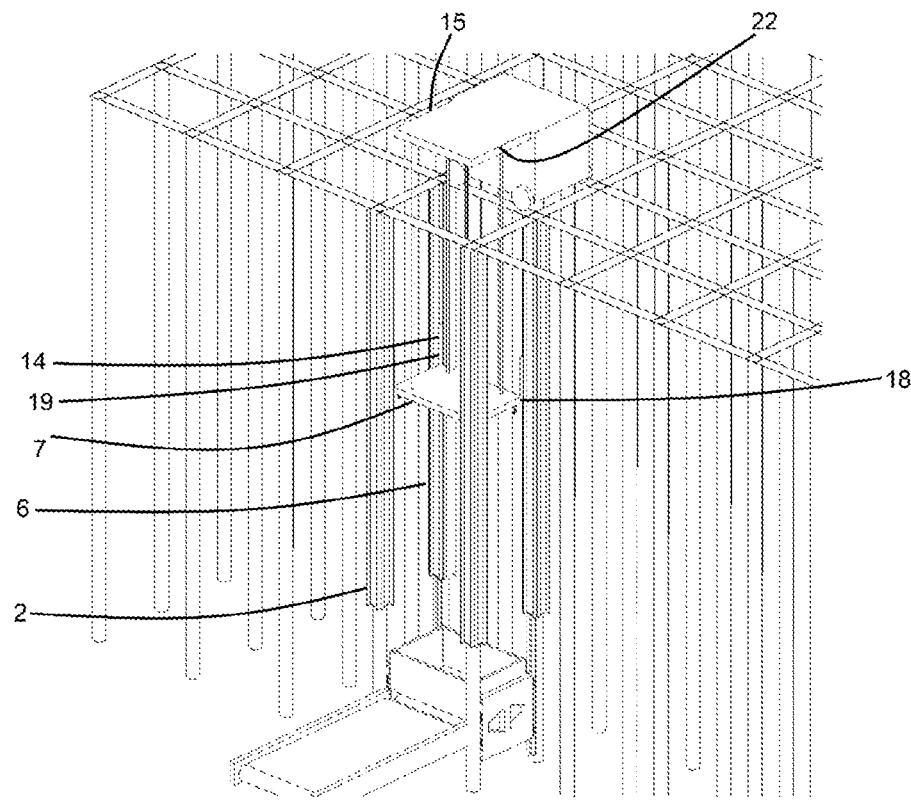

In FIG. 9, the gripper 7 is lowered into the shaft 6, wherein the guide elements 14 cooperate with the inside of the shaft 6 or supports 2. In this case, both the main guide 18 and the auxiliary guide 19 can guide and stabilize the gripper 7. In this case, the insertion into the shaft 6 from above is already simplified, since the guide elements 14, as long as they still cooperate with the closure element 15 in the recess 22, aid in the positioning and thus the insertion of the gripper 7 into the shaft 6. The auxiliary guide 19 in this case guides the gripper 7 on the closure element 15 or robot boom until the main guide 18 is coupled into the shaft 6. The main guide 18 can primarily guide inside the shaft 6.

Figure 10:
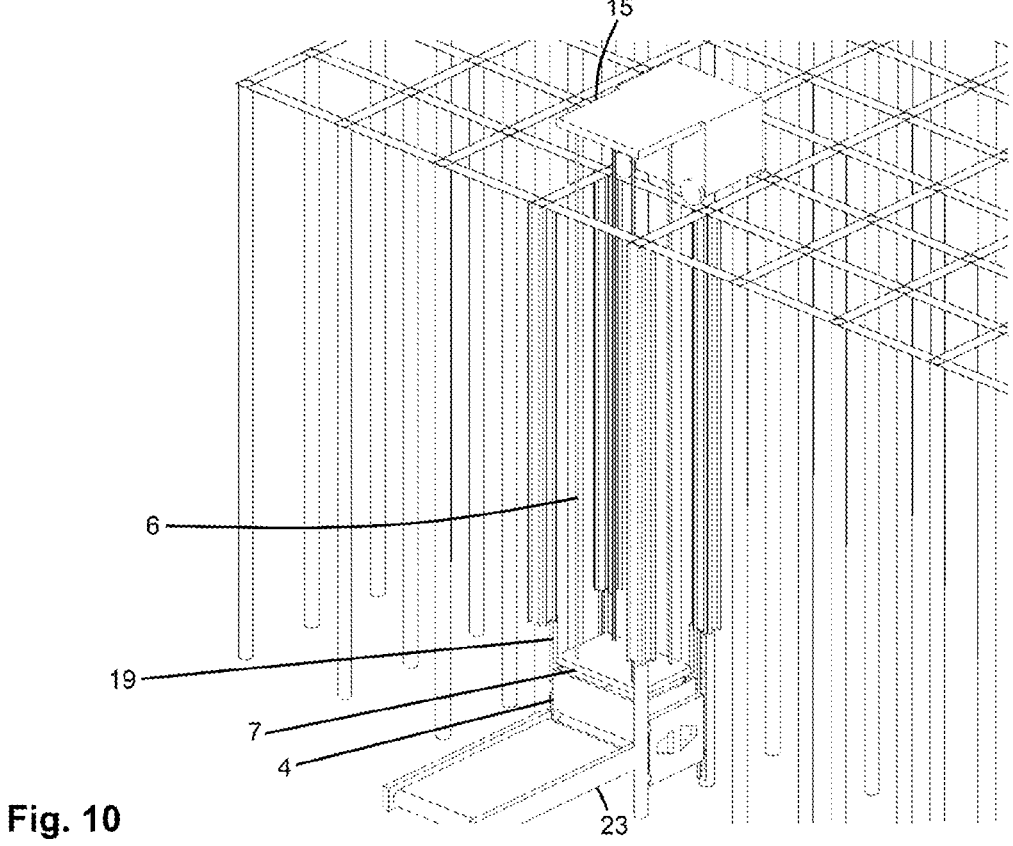

In FIG. 10, the gripper 7 is located outside the shaft 6 directly above the container 4. In this case, the auxiliary guide 19 provides the guidance, such that the gripper 7 is also guided securely and stably outside the shaft 6 in order to precisely contact the container 4.

Figure 11:
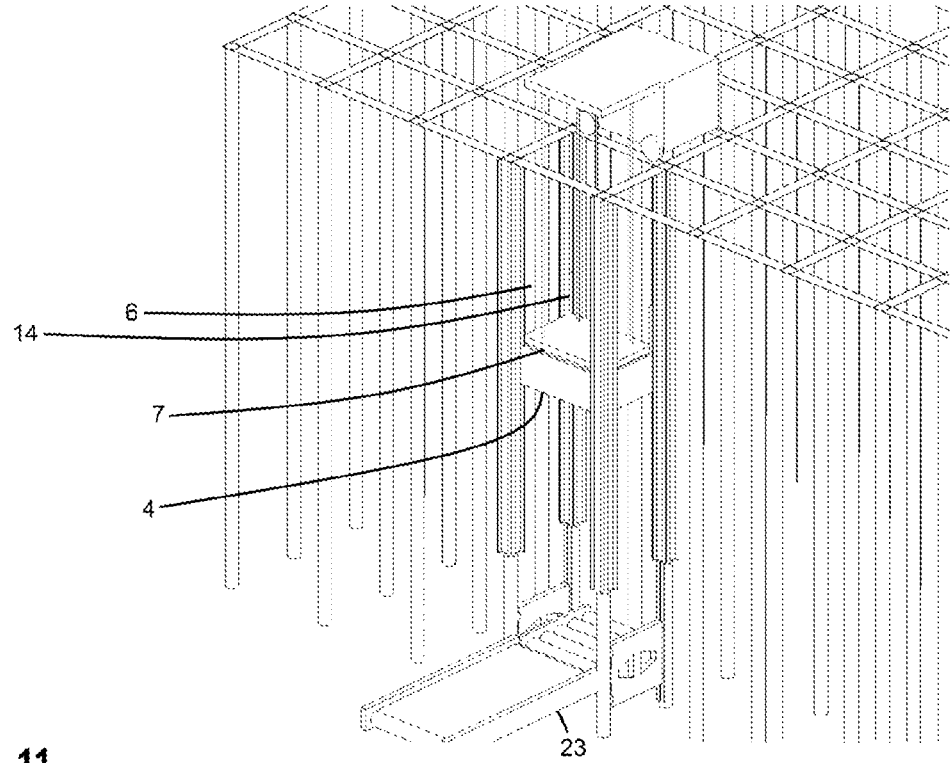

FIG. 11 shows a situation in which the gripper 7 is already located in the shaft 6 after it has received a container 4 from the conveying system 23. The four guide elements 14 securely stabilize the gripper 7 with the container 4 within the shaft 6.

Figure 12:
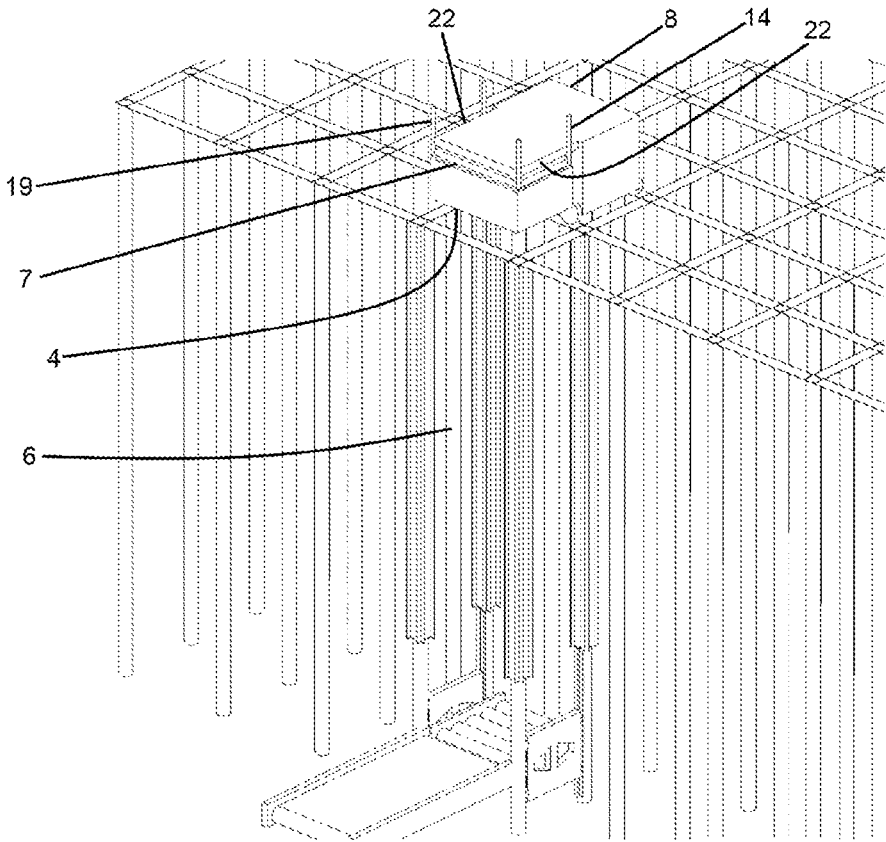

In FIG. 12, the gripper 7, now with the container 4, is again in its uppermost position on the transport robot 8. During the movement out of the shaft 6, the auxiliary guide 19 comes into contact with the recess 22, such that the gripper 7 with the container 4 is also securely guided and stabilized in the upward direction after leaving the shaft 6. This stabilization is important in particular during a subsequent movement of the transport vehicle 8 with the container 4, since this positively influences the driving behavior of the transport vehicle 8.

Due to the guiding action of the auxiliary guide 19 on the gripper 7 and the container 4, shortly after the movement out of the shaft 6 or a storage column 5, a container 4 need only be lifted out of the shaft 6 far enough that it does not slip on the lattice structure 3 during a movement of the transport vehicle 8, or comes into contact with it. As such, a problem-free use of the transport vehicle 8 with the container 4 is made possible without the gripper 7 and/or container 4 vibrating. Complete lifting in the transport vehicle 8 is therefore often not necessary, which saves time. The center of gravity is also lower than if the container 4 is completely raised, which improves the driving dynamics.

Figure 13:
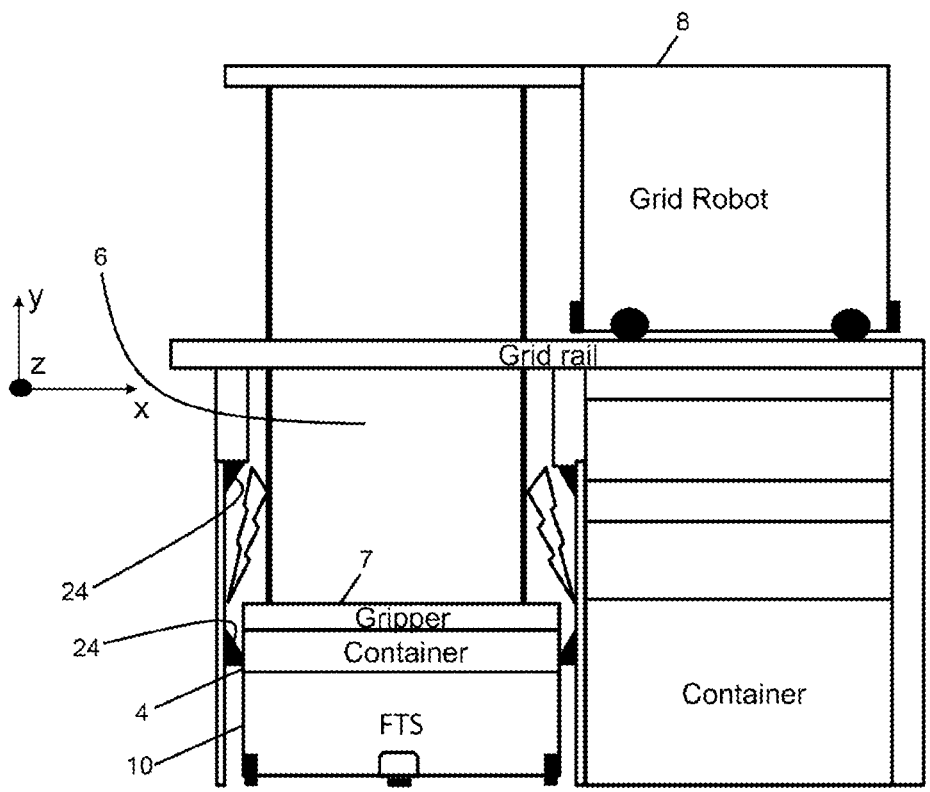
FIG. 13 shows a schematic side view of an illustration of guide bevels which can be implemented additionally in embodiments of the present disclosure, and also in known storage and retrieval systems.

FIG. 13 is a schematic side view of an illustration of guide bevels 24, which can be implemented additionally in the above embodiments, and also in known storage and retrieval systems. These guide bevels 24 facilitate the insertion of the gripper 7 into the shaft 6, and the exact placement of a container 4 on an FTS 10, because they always guide the movement of the gripper 7 and/or container 4.

With regard to other advantageous embodiments of the storage and retrieval system according to the present disclosure, and of the station according to the present disclosure, reference is made to the general portion of the description and the appended claims, to avoid repetition.

Finally, it is expressly pointed out that the above-described embodiments serve only to explain the claimed teaching, but do not restrict it to the embodiments.

LIST OF REFERENCE SIGNS

1 Station
2 Support
3 Lattice structure
4 Container
5 Storage column
6 Shaft
7 Gripper
8 Transport vehicle
9 Container- or gripper guide
10 Driverless transport system (FTS)
11 Recess
12 Corner recess
13 Arrow
14 Guide element
15 Closure element
16 Passage
17 Motor
18 Main guide
19 Auxiliary guide
20 Slide bar
21 Roller
22 Recess
23 Conveyor system
24 Bevel The various embodiments described above can be combined to provide further embodiments. All of the patents, applications, and publications referred to in this specification and/or listed in the Application Data Sheet are incorporated herein by reference, in their entirety. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A storage and retrieval system for containers, comprising:
  a lattice structure having a plurality of lattice cells, each lattice cell defining a storage column of a container storage structure arranged below the lattice structure, the storage columns being designed to receive a vertical stack of containers in each case, and the lattice structure defining longitudinal transport paths in a longitudinal direction and horizontal transport paths in a horizontal direction, and
  at least one transport vehicle for containers designed to travel along the longitudinal transport paths and/or horizontal transport paths,
  wherein a container can be moved along a shaft of a station assigned to the lattice structure by way of a gripper assigned to the transport vehicle or the lattice structure, to create an access to at least one container, and/or along a storage column, substantially in the direction of a lower end of the shaft or of the storage column, coming from a transport vehicle, or in the opposite direction toward the transport vehicle, and wherein a guide device for a guided vertical movement of the gripper outside the shaft or the storage column is assigned to the gripper, the shaft, and/or the storage column, and
  wherein:
    (a) the guide device has at least one guide element which protrudes upward from the gripper, for guiding cooperation with an inner region or structural element of the shaft or of the storage column and/or with an upper closure element of the transport vehicle and/or gripper, and in that the at least one guide element projects upward at least in the uppermost position of the gripper beyond an upper end of the transport vehicle or the closure element, or terminates flush with the upper end or the closure element, and/or
    (b) the guide device has at least one guide element which can be moved downwards from a lower end of the shaft or from at least one support of the shaft, for guiding cooperation with the gripper and/or the container.

2. The storage and retrieval system according to claim 1, wherein the at least one guide element is elongate and/or flat.

3. The storage and retrieval system according to claim 1, wherein the at least one guide element has at least one roller and/or at least one slide bar.

4. The storage and retrieval system according to claim 1, wherein the at least one guide element has a main guide arranged at a height and/or in a region of the gripper, and/or an auxiliary guide arranged above the gripper.

5. The storage and retrieval system according to claim 1, wherein the at least one guide element is able to be coupled and uncoupled from the gripper or shaft or support of the shaft by way of a coupling device.

6. The storage and retrieval system according to claim 1, wherein the at least one guide element has an adjusting device for adjusting the angular position of the guide element relative to a vertical, and/or for adjusting the horizontal position of the guide element.

7. The storage and retrieval system according to claim 1, wherein the closure element has a cover for the transport vehicle and/or the gripper arranged on the upper end of the transport vehicle, or forms an upper side of a housing for the transport vehicle and/or the gripper.

8. The storage and retrieval system according to claim 7, wherein the closure element, the cover, the housing or the upper side has at least one passage and/or at least one recess which is continuous in a vertical direction for the at least one guide element.

9. The storage and retrieval system according to claim 8, wherein the at least one passage and/or the at least one recess has an insertion aid for the at least one guide element.

10. The storage and retrieval system according to claim 7, wherein a guide or lining for the at least one guide element is assigned to the gripper, the closure element, the cover, the housing or the upper side.

11. The storage and retrieval system according to claim 1, wherein multiple guide elements are arranged each in corner regions of the gripper.

12. The storage and retrieval system according to claim 1, wherein the at least one guide element is telescopically extendable and retractable.

13. The storage and retrieval system according to claim 1, wherein a drive for moving the at least one guide element is arranged at the lower end of the shaft or on at least one support of the shaft.

14. The storage and retrieval system according to claim 1, wherein the movement of the at least one guide element can be executed to different distances downwards.

15. A station for a storage and retrieval system according to claim 1.

16. The storage and retrieval system according to claim 2, wherein the at least one guide element is in the form of an elongated profile element, rod, polygonal tube, polygonal rod, mandrel, flat strip, flat sheet, or flat steel.

17. The storage and retrieval system according to claim 3, wherein the at least one roller and/or the at least one slide bar are made of plastic.

18. The storage and retrieval system according to claim 7, wherein the cover and/or the upper side form(s) the upper end of the transport vehicle and/or the gripper.

19. The storage and retrieval system according to claim 9, wherein the insertion aid for the at least one guide element is a funnel or a bevel.

20. The storage and retrieval system according to claim 13, wherein the drive has an electric motor or servomotor.

* * * * *